Figure 1:
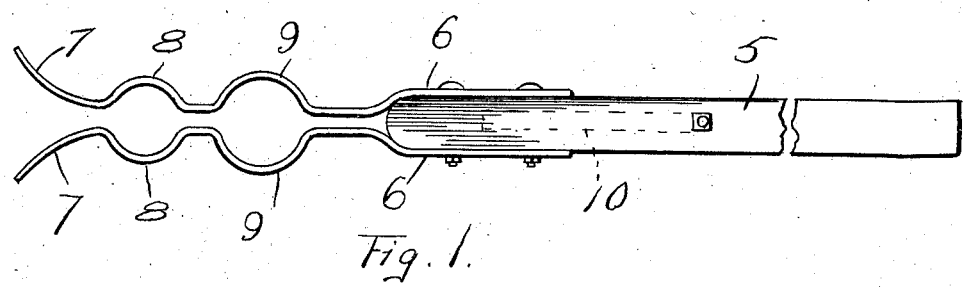

No. 878,928. PATENTED FEB. 11, 1908.
B. E. BAGLEY.
CANE STRIPPER.
APPLICATION FILED MAY 2, 1907.

Witnesses
J. C. Simpson
H. C. McCartney

Inventor
Bseana E. Bagley.
By Chandler & Chandler
Attorneys

UNITED STATES PATENT OFFICE.

BSEANA E. BAGLEY, OF GANTT, ALABAMA.

CANE-STRIPPER.

No. 878,928.      Specification of Letters Patent.      Patented Feb. 11, 1908.

Application filed May 2, 1907. Serial No. 371,505.

*To all whom it may concern:*

Be it known that I, BSEANA E. BAGLEY, a citizen of the United States, residing at Gantt, in the county of Covington, State of Alabama, have invented certain new and useful Improvements in Cane-Strippers; and I do hereby declare the following to be a full, clear, and exact description of the invention, such as will enable others skilled in the art to which it appertains to make and use the same.

The present invention has reference to cane strippers. Heretofore where devices of this class comprising a pair of plates provided with a single bowed blade have been made use of, great difficulty has been experienced in stripping stalks of widely different thicknesses, since neither the resilience of the plates nor the tension of the springs, with which they are provided, is sufficient to retain the blade portion of the plates in properly adjusted position.

It is the object of this invention to provide a cane stripper in which each plate is provided with a pair of beveled cutting portions or blades of different curvature, that of the front blade being somewhat less than that of the rear blade, whereby the device may be used in stripping cane stalks of practically any width, thus greatly increasing its efficiency.

A further object of the invention resides in the provision of a strap adapted to be buckled around the arm of the operator for holding the device in proper position thereon, and in the provision of a hook secured to the handle of the device for pulling the fodder from between the cane stalks.

With the above and other ends in view, the invention consists in the construction, combination, and arrangement of parts, all as hereinafter more fully described, specifically claimed, and illustrated in the accompanying drawings, in which like parts are designated by corresponding reference numerals in both views.

Figure 2:
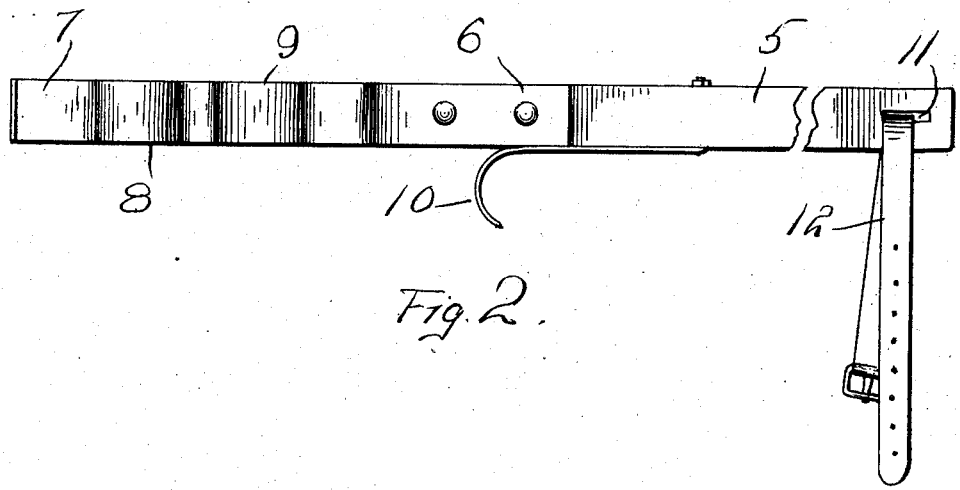

Of the said drawings—Figure 1 is a top plan view of the stripper, and Fig. 2 is a side elevation thereof.

In its practical embodiment the implement comprises a handle 5, having a pair of forwardly projecting resilient plates 6 bolted to its forward end and oppositely disposed with respect to each other. These plates are curved outwardly at their forward ends 7, as shown, and are further provided intermediate their ends with a pair of spaced, bowed portions 8 and 9 arranged opposite each other and having sharpened edges. The curvature of each of the forward bowed portions 8 is slightly less than that of the rear bowed portion 9. The handle is further provided with a rearwardly-extending hook 10, whose shank is secured to the under face of the handle adjacent the forward end thereof and between the plates 6. At its rear end, a slot 11 is formed through the handle in which a strap 12 is engaged, the strap being buckled around the arm of the person using the implement.

In use, a stalk is forced between the plates 6 by an endwise movement of the implement, until the bowed portions 8 or 9 are reached, the resilience of the plates enabling them to yield during such movement, and to clamp the stalk in place between the bowed portions when such point is reached. A downward movement of the implement along the stalk will then cause the sharpened edges of the bowed portions to effectively remove or strip the leaves, the bent hook assisting in such operation, as will be obvious. The weight of the implement is, moreover, borne to a great extent by the strap 12, which is buckled around the arm of the operator, the strain upon his wrist being proportionately lessened.

What is claimed, is—

A cane stripper comprising a handle provided at its rear end with a slot; a pair of oppositely-disposed forwardly-projecting resilient plates secured to the forward end of said handle, said plates having their forward ends curved outwardly and being provided intermediate their ends with a pair of spaced, bowed, portions, arranged opposite each other and having sharpened edges, the curvature of the forward bowed portion of each plate being less than that of the rear portion, to adapt the stripper for use in connection with stalks of varying thicknesses; a rearwardly-extending hook secured to the under face of said handle adjacent the forward end thereof; and a strap engaged in said slot and adapted to be buckled around the arm of the operator, for holding the stripper in place.

In testimony whereof, I affix my signature, in presence of two witnesses.

BSEANA E. BAGLEY.

Witnesses:
   T. R. WRIGHT,
   L. B. VARDAMAN.